Patented Oct. 12, 1926.

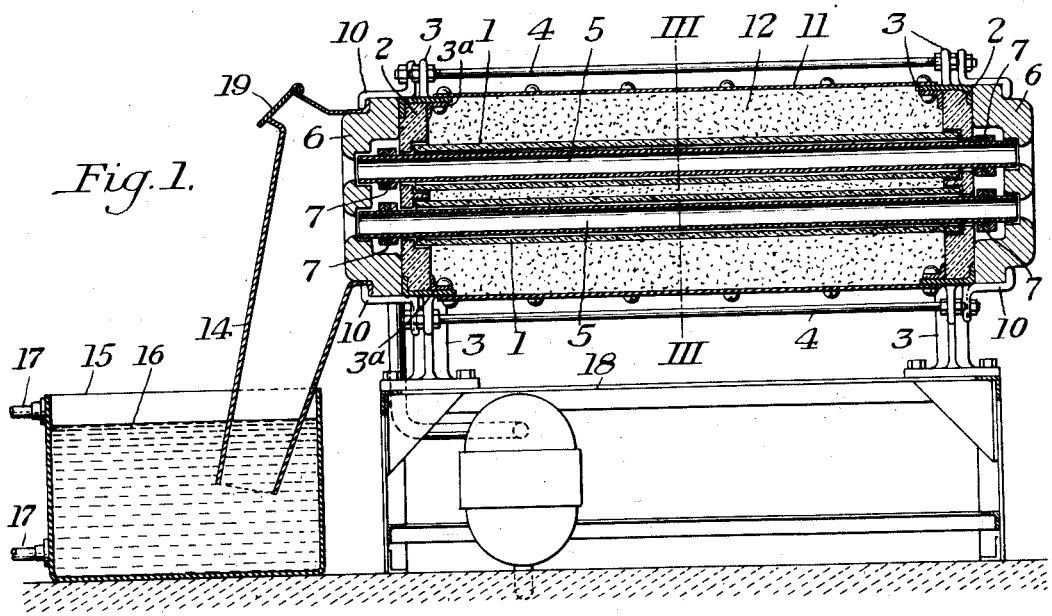
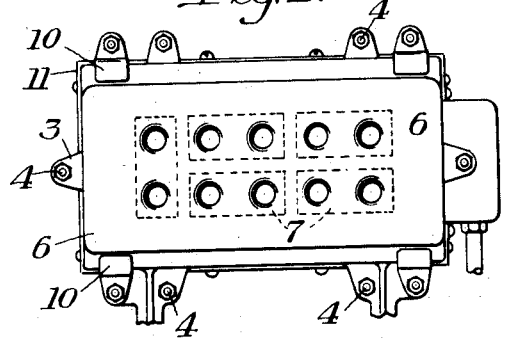
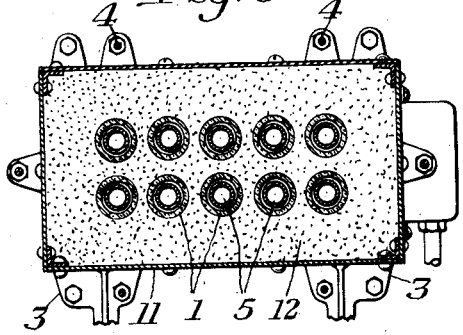
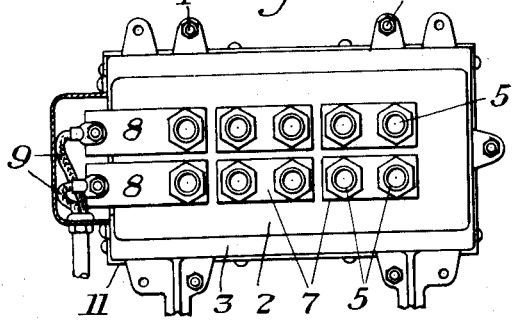
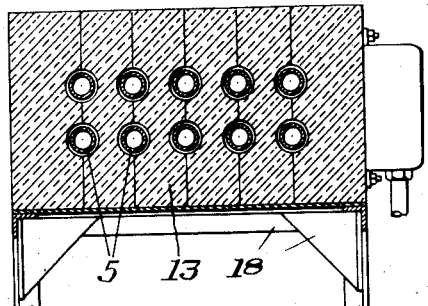

1,603,165

UNITED STATES PATENT OFFICE.

HANS O. SWOBODA, OF EDGEWOOD, AND EARL M. RICHARDS, OF PITTSBURGH, PENNSYLVANIA, ASSIGNORS TO H. O. SWOBODA, INC., OF PITTSBURGH, PENNSYLVANIA, A CORPORATION OF PENNSYLVANIA.

HEAT-TREATING FURNACE.

Application filed April 28, 1925. Serial No. 26,366.

This invention relates to electric heat treating furnaces, and more particularly to furnaces of this type wherein the material to be treated is heated during its passage through one or more tubes or the like.

Certain features of our invention relate to the arrangement of the tubes to form an electrical circuit, tube renewals, the method of thermally insulating the tubes, the use of the heat insulation also as electrical insulation, means for taking care of the expansion of the heated parts, general construction features of the furnace, minimizing heat losses by convection, means of producing non-oxidizing atmosphere in the tubes, and other features set forth in the following description.

A furnace constructed in accordance with our invention may be used for treating any material which is adapted to be heated by passing it through a tube or the like, such as small metal parts, continuous bodies, as wire; liquids; vapors, gases. The word "treating" is not confined to the heating alone, but may include any other phenomenon in a particular process, such as a chemical reaction. As illustrative of our invention, a furnace for heating small metal parts, used in conjunction with a tank of oil for quenching is hereinafter described.

In the accompanying drawings—

Figure 1 is a side view of the furnace and oil tank in section;

Figure 2 is a view of the furnace from the end where the material is introduced;

Figure 3 is a sectional view of the furnace on the line III—III of Figure 1;

Figure 4 is a view of the furnace from the end where the material leaves the same with the end cap removed; and Figure 5 is a view similar to Figure 3 showing a modification.

The furnace comprises tubes 1 held in place by supports 2, cast frames 3 mounted on a stand 18 and in which the supports are held by clamping members 3ª, and tie rods 4. Within the tubes 1 are tubes 5 adapted to heat the material during the passage of the same through the tubes. Tubes 1 and supports 2 are preferably constructed of a refractory material, such as fire clay, but may be of any material or combinations of material so long as the flow of the current in the tubes 5 is not appreciably affected thereby and the whole or part of said tubes 1 and supports 2 shall serve to electrically insulate tubes 5 from each other. Tubes 5 must be electrical conductors, either metallic as shown, such as steel, wrought iron, calorized steel, calorized wrought iron, Monel metal, nickel, nichrome, or non-metallic, such as silit, silundum, carborundum.

The tubes 5 are electrically inter-connected by straps 7 and may be connected to the secondary of a transformer or other source of electrical energy by straps 8 and leads 9, said straps being adapted to be clamped between nuts on the tubes or held by any other means insuring good electric contact while permitting their ready removal. The tubes 5 may be connected in series, in parallel, in series parallel, or may form part of a single or polyphase circuit or may be arranged to form any of the well known electric circuits.

The tubes 5 extend into caps 6, preferably of refractory material, such as fire clay, said caps being held against supports 2 by clamps 10 bolted to the frames 3. Caps 6 cover the portions of the tubes 5 which project beyond the supports 2 and have the straps 7 and 8 attached thereto. They can be replaced by any other form of construction so long as straps 7 and 8 are covered.

Provision is made for variation in size of the heated parts with changes in temperature. For example, tie rods 4 are adjusted so that tubes 1 have longitudinal play in the supports 2 and the holes in supports 2 are of sufficient size to leave clearance for diametral expansion of tubes 1; tubes 5 fit loosely in tubes 1 to permit expansion of the tubes 5 and of the straps 7; and the holes in caps 6 into which the ends of the tubes 5 project are of sufficient size to leave clearance for expansion of the tubes 5.

Between supports 2 is a metal casing 11 which is attached at its ends to the frames 3. The space within said casing and around tubes 1 is preferably filled with some heat insulating material 12, such as granular, powdered or liquid insulation. For this purpose, we may use silocel. As an alternative, the insulation may consist of a solid piece or pieces 13 of fire clay, for example, as shown in Figure 5, in which case the supports 2 and the tubes 1 could be omitted, as the solid material could serve as electrical insulation as well as heat insulation and would serve as the support for the tubes 5.

At the discharge end of the furnace is the chute 14 which is held to the end cap 6 by the clamps 10 and which projects into a body of oil 16 in a tank 15, the oil being cooled by circulation through pipes 17, with the aid of a pump or similar mechanism not shown. The chute cuts off the surrounding atmosphere from one end of the tubes 5 and thereby materially reduces convection currents therethrough with accompanying heat losses. This construction also results in a non-oxidizing atmosphere for the tubes 5, by the latter acting as a vent for the oil vapors generated when the treated material drops into the oil 16. In case the oil vapors passing through tubes 5 are excessive, a vent 19 can be opened in chute 14 permitting the escape of such excess vapors.

Current is supplied to the tubes 5 through the leads 9 and the temperature of the heated portions of the furnace can be controlled by any suitable automatic temperature control devices. To start the furnace in operation, the temperature control devices employed are first set and the electric current then switched on. The pieces are then fed into the open ends of the tubes by hand or by any special form of feeding device. The rate of feed is so regulated that when the pieces drop through the chute 14 into the oil 16, they have reached the desired temperature.

In case it becomes necessary to remove any one of the tubes 5, clamps 10 are loosened and the caps 6 removed. The straps 7 connected to the defective tube 5 are then unfastened and said tube 5 removed. A new tube 5 is then inserted in tube 1 and the various parts replaced. This is an important feature of the invention because one tube can be replaced without disturbing any other tube or the heat insulating material 12 or 13.

While we have shown a particular embodiment of our invention, it will be understood that the invention is not limited to its disclosed embodiment, but that it may be otherwise embodied within the scope of the appended claims without departing from the spirit of the invention.

We claim:

1. In a heat-treating furnace, a plurality of tubes for receiving and heating the material to be treated, and a common detachable connection between some of said tubes and a source of electric energy whereby to heat said tubes through their own electrical resistance.

2. In a heat treating furnace, a plurality of electrical conductors, said conductors being hollow for transmitting therethrough the material to be treated, coverings for said conductors, and connections for heating said conductors through their own electrical resistance, said connections being so arranged that any one conductor may be removed and replaced by another conductor without disturbing its covering or any other conductor.

3. In a heat treating furnace, a plurality of electrical conductors, said conductors being hollow for transmitting therethrough the material to be treated, refractory tubes surrounding said conductors, and connections for heating said conductors through their own electrical resistance, said connections being so arranged that any one conductor may be replaced without disturbing its surrounding tube or any other conductor.

4. In a heat treating furnace, a plurality of tubes for receiving and heating the material to be treated, supports for said tubes, the ends of said tubes being fitted for attaching connections between the tubes and a source of electric energy to heat said tubes through their own electrical resistance, any one of said tubes being renewable without interfering with any other tube.

5. In a heat treating furnace, conduit for receiving and heating the material to be treated, connections to heat electrically said conduit through its own electrical resistance, insulating material surrounding said conduit, and a compartment for said conduit and said material, said conduit being replaceable without disturbing said material.

6. In a heat treating furnace, a plurality of tubes for receiving and heating the material to be treated, supports for said tubes, and connections between said tubes and a source of electric energy arranged to heat said tubes through their own electrical resistance, said tubes being so constructed that said connections can vary in size with a variation in temperature without subjecting said supports to any strain.

7. In a heat treating furnace, a plurality of conduits for receiving and heating the material to be treated, electrical connections for heating each of said conduits through its own electrical resistance, and a single chute adapted to receive material from all of said conduits, said chute substantially excluding atmosphere at the point of egress of said material from all of the tubes.

8. In a heat treating furnace, a plurality of conduits for receiving and heating the material to be treated, electrical connections for heating each of said conduits through its own electrical resistance, and a single chute adapted to receive material from all of said conduits, said chute terminating in a bath adapted to receive the heated material.

9. In a heat treating furnace, a plurality of conduits for receiving and heating the material to be treated, a pair of headers adapted to support the conduits, and electrical conductors connecting conduits whereby current may be supplied through a plurality of conduits and utilized to heat said conduits electrically by their own resistance.

10. In a heat treating furnace, a plurality of conduits for receiving and heating the material to be treated, a pair of headers adapted to support the conduits, and electrical conductors connecting conduits whereby current may be supplied through a plurality of conduits and utilized to heat said conduits electrically by their own resistance, any of said conduits being adapted for withdrawal from the headers without disturbing the other conduits.

11. In a heat treating furnace, a pair of headers adapted to carry a plurality of horizontally extending work supports in spaced relationship, a conduit loosely mounted in each of said supports and conductors electrically connecting the conduits with one another and lying outside the headers.

12. In a heat treating furnace, a pair of headers adapted to carry a plurality of supports in spaced relation, a conduit loosely mounted in each of said supports, electrical connections between the conduits lying outside the headers, and a cap over at least one of the headers adapted to cover all of the conduits.

13. In a heat treating furnace, a pair of headers adapted to carry a plurality of supports in spaced relation, a conduit loosely mounted in each of said supports, electrical connections between the conduits lying outside the headers, and a cap over at least one of the headers adapted to cover all of the conduits, said cap having openings therein coinciding with the openings through the conduits whereby material may be supplied to or from the conduits through the cap.

14. In a heat treating furnace, a pair of headers, a plurality of conduits carried by the headers and extending therebeyond, insulating material between the headers, electrical connections for uniting a plurality of the conduits to form an electrical path therethrough whereby the conduits may be heated by their own resistance, such connections lying outside a header, and a cap lying outside one of said headers and covering the projecting portions of the conduits and the electrical connections therebetween, said cap having openings therethrough coincident with the openings through the conduits.

15. In a heat treating furnace, a pair of headers, a plurality of conduits carried by the headers and extending therebeyond, insulating material between the headers, electrical connections for uniting a plurality of the conduits to form an electrical path therethrough whereby the conduits may be heated by their own resistance, such connections lying outside a header, a cap lying outside one of said headers and covering the projecting portions of the conduits and the electrical connections therebetween, said cap having openings therethrough coincident with the openings through the conduits, and a chute lying beyond said cap and adapted to receive material discharged from any of said conduits.

16. In a heat treating furnace, a pair of headers, a plurality of conduits carried by the headers and extending therebeyond, insulating material between the headers, electrical connections for uniting a plurality of the conduits to form an electrical path therethrough whereby the conduits may be heated by their own resistance, such connections lying outside a header, a cap lying outside one of said headers and covering the projecting portions of the conduits and the electrical connections therebetween, said cap having openings therethrough coincident with the openings through the conduits, and a chute lying beyond said cap and adapted to receive material discharged from any of said conduits, said chute terminating in a material treating bath.

17. A heat treating furnace, comprising a box-like structure terminating in a pair of spaced headers, a plurality of hollow supports extending between the headers, insulating material within the box-like structure and surrounding said hollow supports, a metallic conduit loosely carried in each of said hollow supports and projecting beyond the headers, and electrical connections between the conduits outside the headers.

18. A heat treating furnace, comprising a box-like structure terminating in a pair of spaced headers, a plurality of hollow supports extending between the headers, insulating material within the box-like structure and surrounding said hollow supports, a metallic conduit loosely carried in each of said hollow supports and projecting beyond the headers, electrical connections between the conduits outside the headers, and caps lying outside the headers and covering the projecting portions of the conduits and the electrical connections therebetween, said caps having openings therein coincident with the openings through the conduit to provide a free path for material through each of the conduits.

In testimony whereof we have hereunto set our hands.

HANS O. SWOBODA.
EARL M. RICHARDS.